US011562395B2

(12) United States Patent
Lu et al.

(10) Patent No.: US 11,562,395 B2
(45) Date of Patent: Jan. 24, 2023

(54) SYSTEMS AND METHODS FOR TRAINING OF MULTI-OBJECTIVE MACHINE LEARNING ALGORITHMS

(71) Applicant: Walmart Apollo, LLC, Bentonville, AR (US)

(72) Inventors: Jing Lu, Burlingame, CA (US); Changzheng Liu, Sunnyvale, CA (US); Wei Shen, Pleasanton, CA (US); Lu Wang, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 55 days.

(21) Appl. No.: 17/163,463

(22) Filed: Jan. 31, 2021

(65) Prior Publication Data
US 2022/0245669 A1    Aug. 4, 2022

(51) Int. Cl.
*G06Q 30/00* (2012.01)
*G06Q 30/02* (2012.01)
(Continued)

(52) U.S. Cl.
CPC .......... *G06Q 30/0247* (2013.01); *G06N 5/04* (2013.01); *G06N 20/00* (2019.01); *G06Q 30/0275* (2013.01)

(58) Field of Classification Search
CPC ................................ G06N 20/00; G06N 5/04
See application file for complete search history.

(56) References Cited

U.S. PATENT DOCUMENTS 8,117,066 B1 * 2/2012 Walcott .............. G06Q 30/0242
705/30
8,175,950 B1 * 5/2012 Grebeck ................ G06Q 40/04
705/7.29
(Continued)

FOREIGN PATENT DOCUMENTS

WO      2015020897      2/2015

OTHER PUBLICATIONS

Shi, Lihui, et al. Predict the Click-Through Rate and Average Cost Per Click for Keywords Using Machine Learning Methodologies. 2016 International Conference on Industrial Engineering and Operations Management, Detroit, Sep. 23-25, 2016. IEOM Society International. (Year: 2016).*

(Continued)

*Primary Examiner* — Luis A Brown
(74) *Attorney, Agent, or Firm* — Bryan Cave Leighton

(57) ABSTRACT

Systems and methods including one or more processors and one or more non-transitory storage devices storing computing instructions configured to run on the one or more processors and perform: receiving one or more objectives and one or more constraints from a user electronic device of a user; generating a combined objective using the one or more objectives; calculating, using the combined objective, a return per click for an advertisement campaign; determining one or more bids based on (a) the return per click for the advertisement campaign and (b) a return on advertising spend for the advertisement campaign; estimating, using a first predictive algorithm and the one or more bids, an average cost per click; estimating an expected number of clicks for the advertisement campaign based on the average cost per click; determining a total amount used of the one or more constraints for the one or more bids based on the expected number of clicks for the advertisement campaign; and when the total amount used of the one or more con- (Continued)

straints for the one or more bids exceeds at least one of the one or more constraints, lowering the one or more bids. Other embodiments are disclosed herein.

20 Claims, 5 Drawing Sheets

(51) Int. Cl.
  *G06N 5/04* (2006.01)
  *G06N 20/00* (2019.01)

(56) References Cited

U.S. PATENT DOCUMENTS

| | | | |
|---|---|---|---|
| 8,346,607 B1* | 1/2013 | Benson | G06Q 30/0242 705/41 |
| 8,473,347 B1* | 6/2013 | Koningstein | G06Q 30/02 705/14.43 |
| 8,650,084 B2 | 2/2014 | Athey et al. | |
| 8,706,548 B1 | 4/2014 | Blume et al. | |
| 8,712,832 B2 | 4/2014 | Berkhin et al. | |
| 8,768,766 B2 | 7/2014 | Ellis et al. | |
| 9,407,651 B2 | 8/2016 | Mathis | |
| 10,068,247 B2* | 9/2018 | Xu | G06Q 30/0244 |
| 10,282,758 B1* | 5/2019 | Els | G06Q 30/0269 |
| 10,497,034 B2* | 12/2019 | Yang | G06Q 30/0248 |
| 10,970,742 B1* | 4/2021 | Knijnik | G06N 20/00 |
| 2001/0047297 A1* | 11/2001 | Wen | G06Q 30/0275 705/14.55 |
| 2003/0120662 A1* | 6/2003 | Vishik | G06F 16/367 |
| 2004/0103024 A1* | 5/2004 | Patel | G06Q 30/0247 705/14.53 |
| 2004/0186776 A1* | 9/2004 | Llach | G06Q 30/0273 705/14.69 |
| 2005/0027594 A1* | 2/2005 | Yasnovsky | G06Q 30/0257 705/14.69 |
| 2005/0043998 A1* | 2/2005 | Brass | G06Q 40/02 705/19 |
| 2006/0004628 A1* | 1/2006 | Axe | G06Q 30/0275 705/14.69 |
| 2006/0129453 A1* | 6/2006 | Gardner | G06Q 30/0273 705/14.69 |
| 2006/0248035 A1* | 11/2006 | Gendler | G06F 16/951 |
| 2006/0271426 A1* | 11/2006 | Borgs | G06Q 30/0273 705/14.69 |
| 2007/0157245 A1* | 7/2007 | Collins | G06F 40/30 725/35 |
| 2007/0192190 A1* | 8/2007 | Granville | H04L 43/0876 705/14.69 |
| 2007/0233556 A1* | 10/2007 | Koningstein | G06Q 30/0247 705/14.42 |
| 2007/0288350 A1* | 12/2007 | Bykowsky | G06Q 30/0273 705/14.69 |
| 2008/0103953 A1* | 5/2008 | Flake | G06Q 40/04 705/37 |
| 2008/0140489 A1* | 6/2008 | Berkhin | G06Q 30/0275 705/14.71 |
| 2008/0275770 A1* | 11/2008 | Kitts | G06Q 30/0275 705/14.54 |
| 2009/0070211 A1* | 3/2009 | Gonen | G06Q 30/02 705/14.1 |
| 2009/0070212 A1* | 3/2009 | Gonen | G06Q 30/0207 705/14.1 |
| 2009/0171721 A1* | 7/2009 | LeBaron | G06Q 30/0256 705/14.54 |
| 2009/0292677 A1 | 11/2009 | Kim | |
| 2010/0082439 A9* | 4/2010 | Patel | G06Q 30/0241 705/14.72 |
| 2010/0138291 A1* | 6/2010 | Silverman | G06Q 30/0275 705/14.46 |
| 2010/0250332 A1* | 9/2010 | Ghosh | G06Q 30/02 705/26.1 |
| 2011/0035276 A1* | 2/2011 | Ghosh | G06Q 30/02 705/14.46 |
| 2011/0040611 A1* | 2/2011 | Simmons | G06Q 30/02 705/14.41 |
| 2011/0040612 A1* | 2/2011 | Simmons | G06Q 30/0243 705/14.42 |
| 2011/0040613 A1* | 2/2011 | Simmons | G06Q 30/0273 705/14.42 |
| 2011/0040635 A1* | 2/2011 | Simmons | G06Q 30/0241 705/14.69 |
| 2011/0040636 A1* | 2/2011 | Simmons | G06Q 30/0243 705/14.69 |
| 2011/0131099 A1* | 6/2011 | Shields | G06Q 30/0275 705/14.71 |
| 2011/0231264 A1* | 9/2011 | Dilling | G06Q 30/0275 705/14.71 |
| 2012/0084141 A1* | 4/2012 | Quinn | G06Q 30/0244 705/14.43 |
| 2012/0253948 A1* | 10/2012 | O'Bryan | G06Q 30/0273 705/14.71 |
| 2012/0310729 A1* | 12/2012 | Daito | G06Q 30/0241 705/14.43 |
| 2013/0197996 A1* | 8/2013 | Dunham | G06Q 30/0256 705/14.48 |
| 2014/0006172 A1* | 1/2014 | Pardoe | G06Q 50/01 705/14.71 |
| 2014/0058849 A1* | 2/2014 | Saifee | G06Q 30/0275 705/14.71 |
| 2014/0122221 A1* | 5/2014 | Jordan | G06Q 30/02 705/14.43 |
| 2014/0200995 A1 | 7/2014 | Siegman et al. | |
| 2014/0379464 A1 | 12/2014 | Aronowich et al. | |
| 2015/0081425 A1 | 3/2015 | Siegman et al. | |
| 2015/0095142 A1* | 4/2015 | Nguyen | G06Q 30/0246 705/14.45 |
| 2015/0134462 A1* | 5/2015 | Jalali | G06Q 30/0275 705/14.71 |
| 2015/0134463 A1* | 5/2015 | Jalali | G06Q 30/0275 705/14.71 |
| 2015/0294371 A1* | 10/2015 | Agrawal | G06Q 30/0275 705/14.71 |
| 2015/0332349 A1* | 11/2015 | Els | G06Q 30/0275 705/14.71 |
| 2016/0019583 A1* | 1/2016 | Xu | G06Q 30/0249 705/14.48 |
| 2016/0132926 A1 | 5/2016 | Zimmerman, Jr. et al. | |
| 2016/0210658 A1* | 7/2016 | Chittilappilly | G06Q 30/0246 |
| 2016/0217490 A1* | 7/2016 | Malik | G06Q 30/0247 |
| 2016/0239869 A1* | 8/2016 | Wong | G06Q 30/0256 |
| 2016/0267519 A1 | 9/2016 | Pai et al. | |
| 2016/0292714 A1* | 10/2016 | Bhalgat | G06Q 30/0242 |
| 2016/0379243 A1* | 12/2016 | Kalish | G06Q 30/0242 705/14.41 |
| 2016/0379244 A1* | 12/2016 | Kalish | G06Q 30/0242 705/14.41 |
| 2017/0083965 A1 | 3/2017 | Sun | |
| 2017/0098236 A1 | 4/2017 | Lee et al. | |
| 2017/0213254 A1* | 7/2017 | Bhalgat | G06Q 30/0246 |
| 2017/0222940 A1* | 8/2017 | O'Kelley | H04L 47/50 |
| 2018/0005314 A1* | 1/2018 | Li | G06Q 30/0275 |
| 2018/0053220 A1* | 2/2018 | Bhalgat | G06Q 30/0276 |
| 2018/0204250 A1* | 7/2018 | Watine | G06Q 30/0275 |
| 2018/0211291 A1* | 7/2018 | Chanal | G06Q 30/0277 |
| 2018/0330387 A1* | 11/2018 | Harris | G06Q 10/08 |
| 2019/0034978 A1* | 1/2019 | Karthik | G06Q 30/0275 |
| 2020/0013093 A1* | 1/2020 | Brooks | G06Q 30/0275 |
| 2021/0150584 A1* | 5/2021 | Volkovich | G06Q 30/0275 |

OTHER PUBLICATIONS

Liu, Mengjuan, et al. "An Effective Budget Management Framework for Real-Time Bidding in Online Advertising." IEEE Access, vol. 8, Jan. 30, 2020. (Year: 2020).*

(56) References Cited

OTHER PUBLICATIONS

Cheng, Haibin, et al. "Multimedia Features for Click Prediction of New Ads in Display Advertising." KDD 2012, Aug. 12-16, 2012, Beijing China. Copyright ACM. (Year: 2012).*

* cited by examiner

SYSTEMS AND METHODS FOR TRAINING OF MULTI-OBJECTIVE MACHINE LEARNING ALGORITHMS

TECHNICAL FIELD

This disclosure relates generally to machine learning algorithms, and more specifically training multi-objective machine learning algorithms.

BACKGROUND

Machine learning algorithms (e.g., unsupervised learning, deep learning, supervised learning, etc.) are becoming more commonplace in today's computer systems, but many data scientists and software engineers continue to encounter problems while training novel algorithms (e.g., a multi-objective algorithm). One problem encountered when training machine learning algorithms is a lack of adequate amounts of representative training data. Machine learned algorithms trained on problematic training data suffer from a number of flaws. For example, machine learned algorithms trained on an insufficient amount of data can be inaccurate and, depending on the content of the training data, can overpredict or underpredict outcomes. Further, machine learned algorithms trained on non-representative training data can be skewed due to a unique event in the training data. These inaccuracies can also pose problems for machine learned algorithms used for automatic actions (e.g., automated trading algorithms, search engine marketing algorithms, search engine keyword bidding algorithms, etc.), as a severely overpredicted outcome can lead to recurring overpayments, among other problems.

In the past, solutions to this problem of poor or insufficient amounts of training data have been simply to (1) gather more training data, (2) purchase higher quality training data sets from a vendor, or (3) use a pre-trained model. Each of these past solutions had their own limitations. In many instances, gathering more training data can be time consuming due to the large corpus of training data needed to accurately train a machine learning model. Purchasing training data can also pose problems, as these training datasets can be expensive and can become outdated quickly. The disadvantages of pre-trained models are similar to those seen with purchased training data, as pre-trained models can also be expensive when they are bespoke and can become outdated quickly without updating or re-training. Further, embeddings that have not been seen before by a model or are new can be misclassified by a model (pre-trained or not) due to a lack of representation in the training data (either gathered or purchased). Therefore, there is a need for a system and method to bootstrap training of a machine learning algorithm without obtaining new training data or purchasing a pre-trained model.

BRIEF DESCRIPTION OF THE DRAWINGS

To facilitate further description of the embodiments, the following drawings are provided in which.

Figure 1:
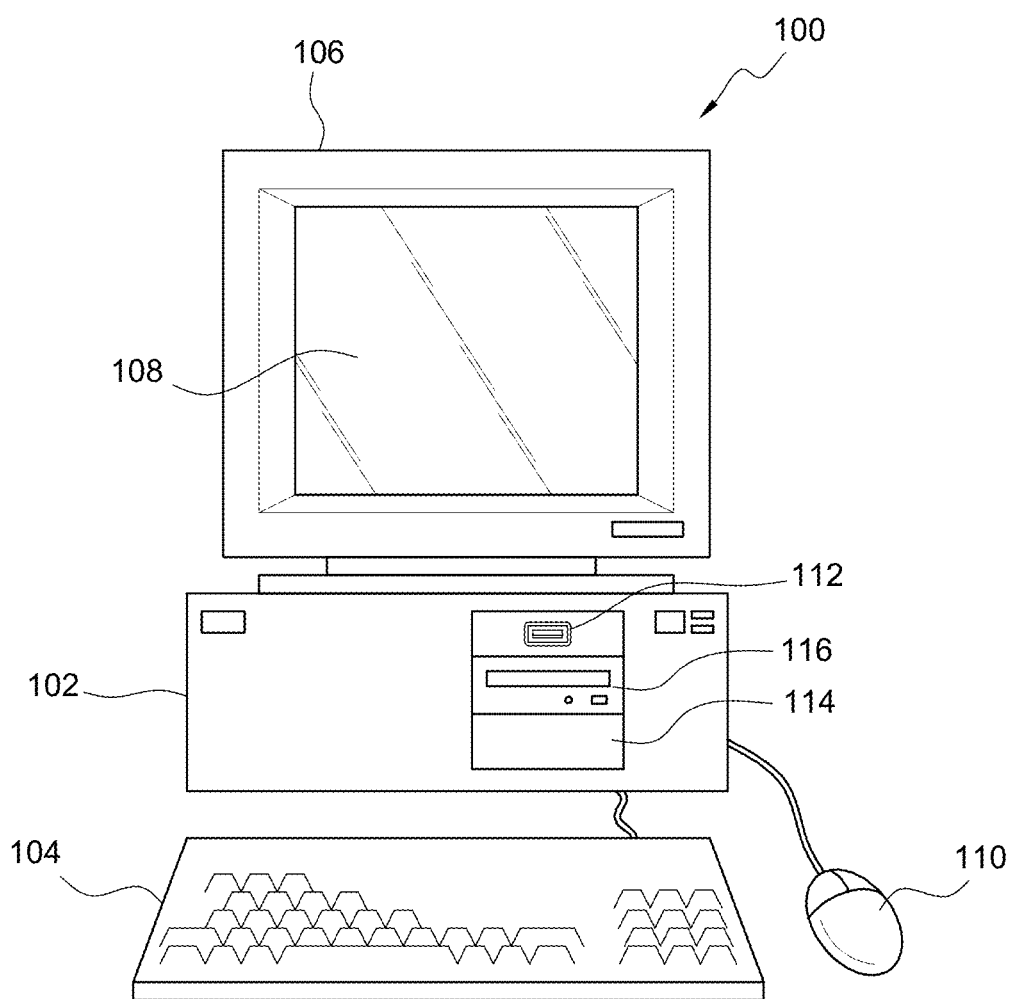
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving one or more objectives and one or more constraints from a user electronic device of a user; generating a combined objective using the one or more objectives; calculating, using the combined objective, a return per click for an advertisement campaign; determining one or more bids based on (a) the return per click for the advertisement campaign and (b) a return on advertising spend for the advertisement campaign; estimating, using a first predictive algorithm and the one or more bids, an average cost per click; estimating an expected number of clicks for the advertisement campaign based on the average cost per click; determining a total amount used of the one or more constraints for the one or more bids based on the expected number of clicks for the advertisement campaign; and when the total amount used of the one or more constraints for the one or more bids exceeds at least one of the one or more constraints, lowering the one or more bids.

Various embodiments include a method. The method can be implemented via execution of computing instructions configured to run at one or more processors and configured to be stored at non-transitory computer-readable media The method can comprise receiving one or more objectives and one or more constraints from a user electronic device of a user; generating a combined objective using the one or more objectives; calculating, using the combined objective, a return per click for an advertisement campaign; determining one or more bids based on (a) the return per click for the advertisement campaign and (b) a return on advertising spend for the advertisement campaign; estimating, using a first predictive algorithm and the one or more bids, an average cost per click; estimating an expected number of clicks for the advertisement campaign based on the average cost per click; determining a total amount used of the one or more constraints for the one or more bids based on the expected number of clicks for the advertisement campaign; and when the total amount used of the one or more constraints for the one or more bids exceeds at least one of the one or more constraints, lowering the one or more bids.

Figure 2:
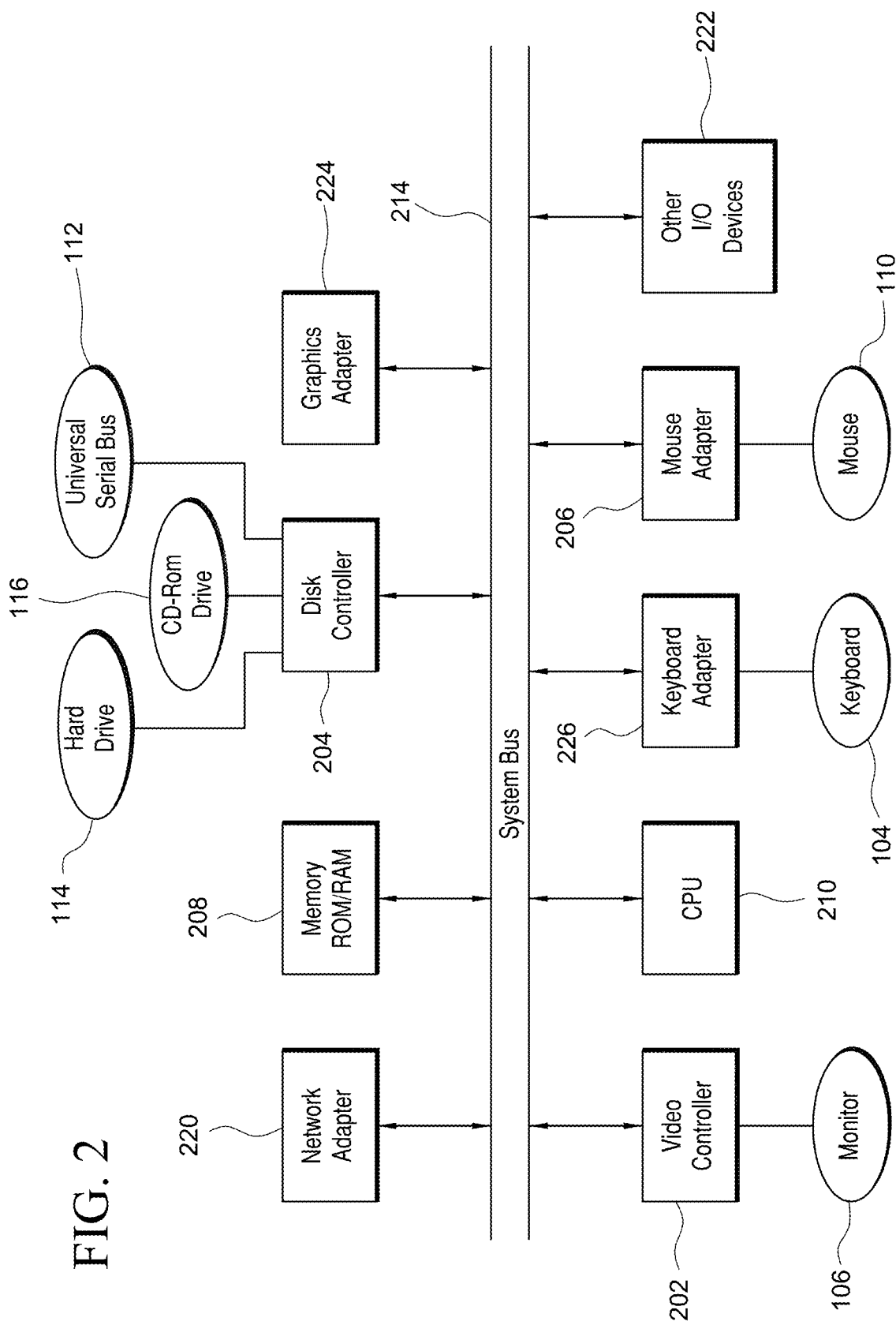
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux®

OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
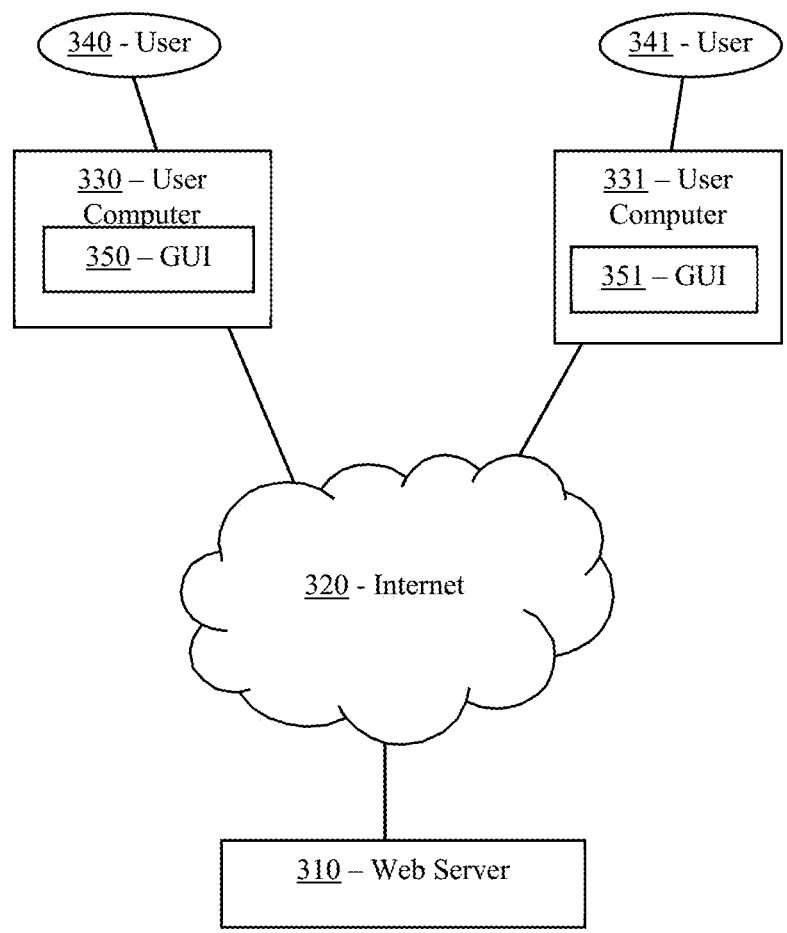
FIG. 3 illustrates a representative block diagram of a system, according to an embodiment.

Turning ahead in the drawings, FIG. 3 illustrates a block diagram of a system 300 that can be employed for training multi-objective machine learning algorithms, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or user computers 330, 331. Web server 310 and/or user computers 330, 331 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or user computers 330, 331. Additional details regarding web server 310 and/or user computers 330, 331 are described herein.

In many embodiments, system 300 can comprise user computers 340, 341. In other embodiments, user computers 340, 341 are external to system 300. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 350, 351. In the same or different embodiments, GUI 350, 351 can be part of and/or displayed by user computers 340, 341, which also can be part of system 300. In some embodiments, GUI 350, 351 can comprise text and/or graphics (image) based user interfaces. In the same or different embodiments, GUI 350, 351 can comprise a heads up display ("HUD"). When GUI 350, 351 comprises a HUD, GUI 350, 351 can be projected onto glass or plastic, displayed in midair as a hologram, or displayed on monitor 106 (FIG. 1). In various embodiments, GUI 350, 351 can be color or black and white. In many embodiments, GUI 350, 351 can comprise an application running on a computer system, such as computer system 100, user computers 330, 331, and/or web server 310. In the same or different embodiments, GUI 350, 351 can comprise a website accessed through internet 320. In some embodiments, GUI 350, 351 can comprise an eCommerce website. In these or other embodiments, GUI 350, 351 can comprise an administrative (e.g., back end) GUI allowing an administrator to modify and/or change one or more settings in system 300. In the same or different embodiments, GUI 350, 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with user computers 330, 331. In certain embodiments, user computers 340, 341 can be desktop computers, laptop computers, smart phones, tablet devices, and/or other endpoint devices. Web server 310 can host one or more websites. For example, web server 310 can host website allowing users 340, 341 to generate and train multi-objective machine learning algorithms.

In many embodiments, web server 310 and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In Many embodiments, web server 310 and/or user computers 330, 331 can communicate or interface (e.g., interact) with one another through a network or internet 320. Internet 320 can be an intranet that is not open to the public. In further embodiments, internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for an improved machine learning algorithm. These techniques described herein can provide a significant improvement over conventional machine learning algorithms by allowing multiple objectives to be specified by an individual implementing the algorithm. In many embodiments, the techniques described herein can beneficially create a feedback loop that allows a machine learning algorithm to converge on a most accurate bid amount. In this way, the techniques described herein can avoid problems with stale and/or outdated machine learned models by continually updating based on feedback from the loop.

In a number of embodiments, the techniques described herein can solve a technical problem that arises only within the realm of computer networks, as bidding on search engine advertisements does not exist outside the realm of computer networks.

Figure 4:
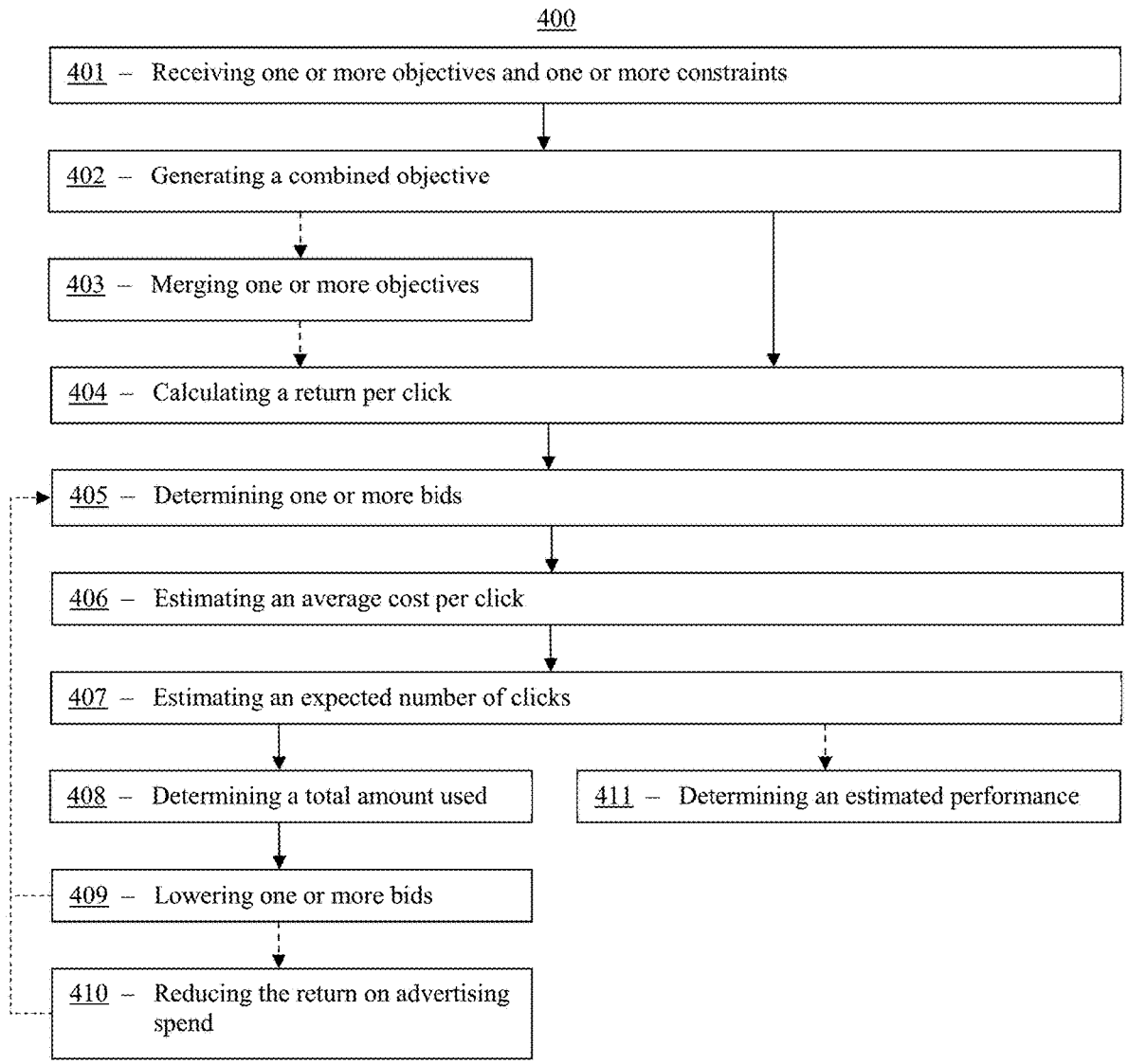
FIG. 4 illustrates a flowchart for a method, according to certain embodiments.

Turning ahead in the drawings, FIG. 4 illustrates a flow chart for a method 400, according to an embodiment.

Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310, and/or user computers 330, 331 (FIG. 3). The processing module(s) can be similar or identical to the processing module(s) described above with respect to computer system 100 (FIG. 1).

In many embodiments, method 400 can comprise an activity 401 of receiving one or more objectives and one or more constraints. In these or other embodiments, one or more objectives can comprise one or more objectives to optimize in a multi-objective algorithm. In some embodiments, one or more objectives can be for one or more advertisements, one or more keywords, and/or one or more advertisement campaigns. For example, the one or more objectives can be to optimize revenue generated from the campaign, profit generated from the campaign, orders generated from the campaign, clicks generated from the campaign, and/or new customers acquired from an advertisement/advertising campaign. In many embodiments, an objective can also be weighted based on an importance in the optimization. In some embodiments, a weight for an objective can be set by a user (e.g., users 340, 341 (FIG. 4)). In these or other embodiments, one or more objectives and one or more constraints can be received from a user electronic device (e.g., user computers 330, 331 (FIG. 3)). In many embodiments, one or more constraints can comprise one or more limits put on a multi-objective algorithm described herein. For example, when a multi-objective algorithm is used to optimize an advertising campaign, one or more constraints can comprise a total budget for implementing an advertising campaign.

In many embodiments, method 400 can comprise an activity 402 of generating a combined objective. In these or other embodiments, a combined objective can be generated using one or more objectives, as described above. A combined objective can be considered an amalgamation and/or average of its constituent part objectives. In many embodiments, a combined objective can be generated using weighted objectives, as described above. In this way, a user setting objectives can ensure that one or more objectives can have a larger influence on a multi-objective algorithm than other objectives, based on the respective weights of the objectives.

In some embodiments, method 400 can optionally comprise activity 403 of merging one or more objectives. In many embodiments, activity 403 can be performed at the same time or as a part of activity 402. In these or other embodiments, merging one or more objectives can comprise combining one or more objectives in proportion to their weights. In many embodiments, a weighted objective can be calculated by taking an average value of one or more objectives. In various embodiments, a weighted objective can be calculated after normalizing and scaling one or more objectives to a unitless value. In various embodiments, scaling one or more objective can ensure that median values within the one or more objectives are approximately identical.

In many embodiments, method 400 can comprise an activity 404 of calculating a return per click. In some embodiments, a return per click can be calculated using one or more objectives and/or a combined objective, as described above. In these or other embodiments, a return per click can comprise a numerical value indicating a return on an objective for every click on an advertisement in an advertising campaign. For example, when profit is an objective, a reward per click can comprise an amount of profit gained for each click on an advertisement. In these or other embodiments, a return per click can comprise an average value calculated over all clicks on an advertisement during a period of time. In many embodiments, a reward per click can be calculated for a combined objective and/or a weighted combined objective. In various embodiments, a reward per click can be calculated by summing one or more return per clicks of one or more objectives. In these or other embodiments, a return per click can be calculated after an objective has been normalized and/or scaled as described above.

In many embodiments, method 400 can comprise an activity 405 determining one or more bids. In these or other embodiments, one or more bids can be determined using a return per click and/or a return on advertising spend. In various embodiments, one or more bids can comprise an estimated maximum bid (or estimated maximum value) for an impression slot showing an advertisement, keyword, or advertising campaign. In various embodiments, a bid can be determined by dividing the return per click by the return on advertising spend. In these or other embodiments, a bit can be determined by dividing a weighted return per click by a weighted return on advertising spend ("ROAS"). In many embodiments, (e.g., before activities 409 and/or 410 are performed) an initial value for ROAS can be calculated. In these embodiments, a predictive model (e.g., a machine learning model) can be used to calculate ROAS. For example, a log-log regression model can be built to predict return given one or more constraints (e.g. an advertising budget). In these or other embodiments, a training dataset (as described in further detail below) for a predictive model calculating ROAS can comprise historical values for one or more constraints and/or historical values for ROAS.

In many embodiments, method 400 can comprise an activity 406 of estimating an average cost per click. In these or other embodiments, an average cost per click can be generated, at least in part, using one or more bids. In various embodiments, a predictive algorithm can be used to estimate an average cost per click. In these or other embodiments, a predictive algorithm can comprise a hierarchical linear regression algorithm. In many embodiments, a predictive algorithm (e.g., a hierarchical linear regression algorithm) can be trained.

In some embodiments, training a predictive algorithm can comprise estimating internal parameters of a model configured to estimate an average cost per click. In various embodiments, a machine learning algorithm can be trained using labeled training data, otherwise known as a training dataset. In many embodiments, a training dataset can comprise historical data for a category in a hierarchical categorization. In these or other embodiments, historical data for a category can comprise measurements of bids and corresponding average cost per click for the category. In various embodiments, an additional, non-historical feature can be added to historical data to enhance its accuracy as a training dataset. For example, specifications (e.g., descriptions) of an item can be added to historical data. In various embodiments, features quantifying a historical competitiveness of an advertisement or advertising campaign can be added to a training data set. For example, search click ratio and/or an impression share ratio can be added to show whether an advertisement was competitive after an advertisement auction has been completed. In many embodiments, a training dataset can be aggregated over a predetermined time period. For example, one day's worth of historical data for items in a category of an advertised item can be used to train a predictive algorithm. In this way, a predictive algorithm can be trained when there is insufficient labeled training data for a specific advertisement, keyword, or campaign. By training a predictive algorithm on a related item's data instead of no or too little data about the item, problems associated with inaccuracies and over/under trained algorithms can be avoided and a more accurate multi-objective algorithm can be executed.

In the same or different embodiments, a pre-trained predictive algorithm can be used, and the pre-trained algorithm can be re-trained on the labeled training data. In some embodiments, the predictive model can also consider both historical and dynamic input from items in a category of an advertised item. In this way, a predictive algorithm can be trained iteratively as data from the category is added to a training data set. In many embodiments, a predictive algorithm can be iteratively trained in real time as data is added to a training data set. In various embodiments, a predictive algorithm can be trained, at least in part, on a single user's (e.g., user 350) click data, or the single user's click data can be weighted in a training data set. In this way, a predictive algorithm tailored to a single user can be generated. In the same or different embodiments, a predictive algorithm tailored to a single user can be used as a pre-trained algorithm for a similar user. In several embodiments, due to a large amount of data needed to create and maintain a training data set, a predictive model can use extensive data inputs. Due to these extensive data inputs, in many embodiments, creating, training, and/or using a predictive algorithm as described herein cannot practically be performed in a mind of a human being.

In many embodiments, method 400 can comprise an activity 407 of estimating an expected number of clicks. In these or other embodiments, an expected number of clicks can be generated, at least in part, using an average cost per click. In the same or different embodiments, the expected number of clicks can be generated using one or more of the average cost per click, the return per click, or the return on advertising spend for the advertising campaign. In various embodiments, a predictive algorithm can be used to estimate an expected number of clicks. In these or other embodiments, a predictive algorithm in activity 407 can be similar to a predictive algorithm in activity 406, but can be trained on different training data. For example, a predictive algorithm in activity 407 can be trained on historical data describing an average cost per click and a number of clicks for a different category during a different time period. In embodiments where the predictive algorithm is used to estimate the expected number of clicks, the estimation process does not need to be generated using the return per click or the return on advertising spend for the advertising campaign.

In many embodiments, method 400 can comprise an activity 408 of determining a total amount used of one or more constraints. In various embodiments, a total amount used can be determined based on one or more bids and an expected number of clicks. In these or other embodiments, a total amount used of one or more constraints can comprise a total cost of an advertising campaign (e.g., an amount of a budget used). In various embodiments, a total amount can be calculated by multiplying an estimated number of clicks by a cost per click (e.g., an average cost per click or a bid amount). A number of things can happen depending on whether a total amount used exceeds one or more constraints. For example, in some embodiments a total amount used does not exceed one or more constraints, and method 400 can terminate.

In many embodiments, method 400 can comprise an activity 409 of lowering one or more bids. In some embodiments, one or more bids can be lowered until a total amount used is within one or more constraints. In various embodiments, due to the structure of system 300 (FIG. 3) and method 400, one or more bids cannot be directly lowered by a user of the method. Therefore, in some embodiments, method 400 can optionally comprise activity 410 of reducing a return on advertising spend. In many embodiments, activity 410 can be performed at the same time or as a part of activity 409. In these or other embodiments, a return on advertising spend can be lowered in an iterative process that uses a feedback loop to find an optimal value of a return on advertising spend. For example, a reduced return on advertising spend can be shunted back into activity 405, as described above, and a new total amount used can be determined for one or more bids in activity 405. Activity 405, activity 406, activity 407, etc. can be repeated one or more times such that method 400 continues until the new total amount used is within one or more constraints. In many embodiments, a return on advertising spend can be lowered by half in activity 410 before it is shunted back into activity 405. In other embodiments, return on advertising spend can be decreased by different amounts and/or increased. In various embodiments, an algorithmic approach can be used to lower a bid and/or a ROAS. For example, a one-dimensional Brent-Dekker method to lower a ROAS.

In some embodiments, method 400 can optionally comprise activity 411 of determining an estimated performance. Activity 411 can occur after or part of activity 407, and activity 411 also can occur before activity 409 and/or 410. In many embodiments, an estimated performance can be determined using a weighted return per click and an expected number of clicks. In these or other embodiments, an estimated performance can be determined by multiplying a weighted return per click and an expected number of clicks together. In many embodiments, an estimated performance can be displayed to a user (e.g., on user computer 330, 331). In these or other embodiments, various visualizations can be created to model the return per click against other metrics. For example, a future amount of an objective (e.g., can be predicted total revenue, profit, number of newly acquired customers, total number of orders, and/or advertising spending) can be predicted. A user of method 400 can then check whether this prediction matches with their objectives and adjust their bids accordingly.

Figure 5:
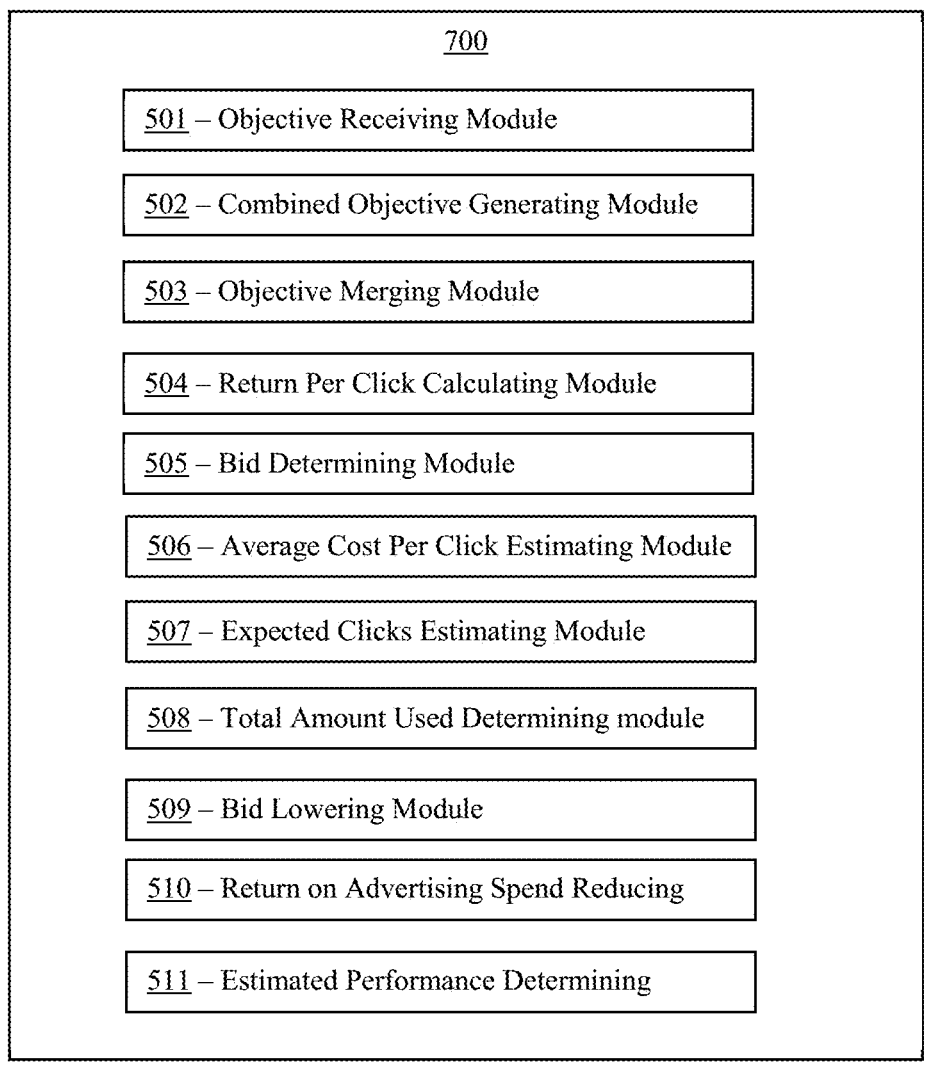
FIG. 5 illustrates a representative block diagram of a system, according to an additional embodiment.

Turning ahead in the drawings, FIG. 5 illustrates a block diagram of a system 500 that can be employed for training multi-objective machine learning algorithms. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In many embodiments, elements of system 500 can be implemented in one or more of web server 310 (FIG. 3) and/or user computers 330, 331 (FIG. 3).

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as objective receiving module 501. In many embodiments, objective receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as combined objective generating module 502. In many embodiments, combined objective generating module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as objective merging module 503. In many embodiments, objective merging module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as return per click calculating module 504. In many embodiments, return per click calculating module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as bid determining module 505. In many embodiments, bid determining module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as average cost per click estimating module 506. In many embodiments, average cost per click estimating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as expected clicks estimating module 507. In many embodiments, expected clicks estimating module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as total amount used determining module 508. In many embodiments, total amount determining module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as bid lowering module 509. In many embodiments, bid lowering module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as return on advertising spend reducing module 510. In many embodiments, return on advertising spend reducing module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as estimated performance determining module 511. In many embodiments, estimated performance determining module 510 can store computing instructions configured to run on one or more processing modules and perform one or more acts of method 400 (FIG. 4) (e.g., activity 411 (FIG. 4)).

Although systems and methods for training multi-objective machine learning algorithms have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform functions comprising:

receiving one or more objectives and one or more constraints from an electronic device of a user;

generating a combined objective using the one or more objectives;

calculating, using the combined objective, a return per click for an advertisement campaign;

determining one or more bids based on (a) the return per click for the advertisement campaign and (b) a return on advertising spend (ROAS) for the advertisement campaign;

training a machine learning model using a first predictive algorithm and a training dataset, wherein inputs to the first predictive algorithm comprise combined historical data for at least one level of a hierarchical categorization and at least one additional feature not present in the combined historical data, and wherein an output of the first predictive algorithm comprises an average cost per click;

estimating, using the first predictive algorithm, as trained, the one or more bids based on the average cost per click;

estimating an expected number of clicks for the advertisement campaign based on the average cost per click;

determining a total amount used of the one or more constraints for the one or more bids based on the expected number of clicks for the advertisement campaign; and when the total amount used of the one or more constraints for the one or more bids exceeds at least one of the one or more constraints, lowering the one or more bids, wherein lowering the one or more bids comprises repeating (1) estimating a portion of the one or more constraints, (2) estimating the expected number of clicks for the advertising campaign, and (3) determining the total amount used of the one or more constraints for the one or more bids, as re-determined, until the total amount used of the one or more constraints for the one or more bids, as re-determined, complies with each constraint of the one or more constraints.

2. The system of claim 1, wherein lowering the one or more bids further comprises:

reducing the ROAS; and re-determining the one or more bids based on the ROAS, as reduced.

3. The system of claim 1, wherein the first predictive algorithm comprises a hierarchical linear regression algorithm.

4. The system of claim 1, wherein the first predictive algorithm is trained, at least in part, using historical data for a related item when there is insufficient labeled training data for an advertisement, a keyword, or a campaign.

5. The system of claim 1, wherein the first predictive algorithm is trained iteratively in real time as additional data is added to the training dataset, wherein the additional data comprises dynamic data from an item in a category.

6. The system of claim 1, wherein:

receiving the one or more objectives from the user comprises:

receiving the one or more objectives and a respective weight for each respective objective of the one or more objectives; and generating the combined objective comprises:

merging the one or more objectives into the combined objective according to each respective weight for each respective objective of the one or more objectives.

7. The system of claim 1, wherein determining the one or more bids comprises:

dividing the return per click by the ROAS; and dividing a weighted return per click by a weighted return on the ROAS.

8. The system of claim 1, wherein the computing instructions when executed on the one or more processors, further cause the one or more processors to perform functions comprising:

determining an estimated performance of the one or more objectives using the return per click and the expected number of clicks; and coordinating displaying the estimated performance of the one or more objectives on a user interface of the electronic device of the user.

9. The system of claim 1, wherein the one or more bids comprises a maximum value for the average cost per click.

10. The system of claim 1, wherein the return per click is limited by an upper bound.

11. A method being implemented via execution of computing instructions configured to run on one or more processors and stored at one or more non-transitory computer-readable media, the method comprising:

receiving one or more objectives and one or more constraints from an electronic device of a user;

generating a combined objective using the one or more objectives;

calculating, using the combined objective, a return per click for an advertisement campaign;

determining one or more bids based on (a) the return per click for the advertisement campaign and (b) a return on advertising spend (ROAS) for the advertisement campaign;

training a machine learning model using a first predictive algorithm and a training dataset, wherein inputs to the first predictive algorithm comprise combined historical data for at least one level of a hierarchical categorization and at least one additional feature not present in the combined historical data, and wherein an output of the first predictive algorithm comprises an average cost per click;

estimating, using the first predictive algorithm, as trained, the one or more bids based on the average cost per click;

estimating an expected number of clicks for the advertisement campaign based on the average cost per click;

determining a total amount used of the one or more constraints for the one or more bids based on the expected number of clicks for the advertisement campaign; and when the total amount used of the one or more constraints for the one or more bids exceeds at least one of the one or more constraints, lowering the one or more bids wherein lowering the one or more bids comprises repeating (1) estimating a portion of the one or more constraints, (2) estimating the expected number of clicks for the advertising campaign, and (3) determining the total amount used of the one or more constraints for the one or more bids, as re-determined, until the total amount used of the one or more constraints for the one or more bids, as re-determined, complies with each constraint of the one or more constraints.

12. The method of claim 11, wherein lowering the one or more bids further comprises:
   reducing the ROAS; and
   re-determining the one or more bids based on the ROAS, as reduced.

13. The method of claim 11, wherein the first predictive algorithm comprises a hierarchical linear regression algorithm.

14. The method of claim 11, wherein the first predictive algorithm is trained, at least in part, using historical data for a related item when there is insufficient labeled training data for an advertisement, a keyword, or a campaign.

15. The method of claim 11, wherein the first predictive algorithm is trained iteratively in real time as additional data is added to the training dataset, wherein the additional data comprises dynamic data from an item in a category.

16. The method of claim 11, wherein:
   receiving the one or more objectives from the user comprises:
      receiving the one or more objectives and a respective weight for each respective objective of the one or more objectives; and
   generating the combined objective comprises:
      merging the one or more objectives into the combined objective according to each respective weight for each respective objective of the one or more objectives.

17. The method of claim 11, wherein determining the one or more bids comprises:
   dividing the return per click by the ROAS; and
   dividing a weighted return per click by a weighted return on the ROAS.

18. The method of claim 11 further comprising:
   determining an estimated performance of the one or more objectives using the return per click and the expected number of clicks; and
   coordinating displaying the estimated performance of the one or more objectives on a user interface of the electronic device of the user.

19. The method of claim 11, wherein the one or more bids comprises a maximum value for the average cost per click.

20. The method of claim 11, wherein the return per click is limited by an upper bound.

* * * * *